United States Patent [19]

Kawabata et al.

[11] Patent Number: 5,038,090

[45] Date of Patent: Aug. 6, 1991

[54] SERVO MOTOR CONTROL APPARATUS

[75] Inventors: Yasutomo Kawabata, Aichi; Ryoji Mizutani, Toyota; Hirosumi Suzuki, Toyota, all of Japan

[73] Assignee: Toyota Jidosha Kabushiki Kaisha, Aichi, Japan

[21] Appl. No.: 416,771

[22] Filed: Oct. 4, 1989

[30] Foreign Application Priority Data

Oct. 5, 1988 [JP] Japan .................................. 63-251064
Oct. 5, 1988 [JP] Japan .................................. 63-251065
Jun. 16, 1989 [JP] Japan .................................. 1-155247

[51] Int. Cl.$^5$ .............................................. H02P 7/36
[52] U.S. Cl. .................................. 318/721; 318/802; 318/809; 318/811
[58] Field of Search ............... 318/721, 802, 809, 811

[56] References Cited

U.S. PATENT DOCUMENTS 4,384,242 5/1983 Ono ..................................... 318/721
4,477,762 10/1984 Kurakaku et al. .................. 318/802
4,703,245 10/1987 Sakamoto et al. ................. 318/809

Primary Examiner—William M. Shoop, Jr.
Assistant Examiner—Saul M. Bergmann
Attorney, Agent, or Firm—Finnegan, Henderson, Farabow, Garrett & Dunner

[57] ABSTRACT

A servo motor control apparatus effecting a feedback control of a servo motor according to an external operation command. The apparatus includes: an operational running state detecting unit for detecting a running state of the servo motor; a memory unit in which data representing inter-relation values are stored; a current value computing unit for computing an appropriate drive current value for the external operation comand; and a driving unit for driving the servo motor according to the computed appropriate drive current value. By defining the inter-relation values in advance in accordance with operational states of the servo motor so that a drive power of the servo motor approximates a value indicated by the external operation command and specifying an inter-relation value corresponding to the detected operational state with reference to the defined inter-relations to compute the appropriate drive current value, it is possible to compensate a phase difference between a current command value and an actual current irrespective of the rotational speed; and improve the response of the control apparatus to decrease a time lag of an output torque and a microscopic fluctuation thereof.

11 Claims, 9 Drawing Sheets

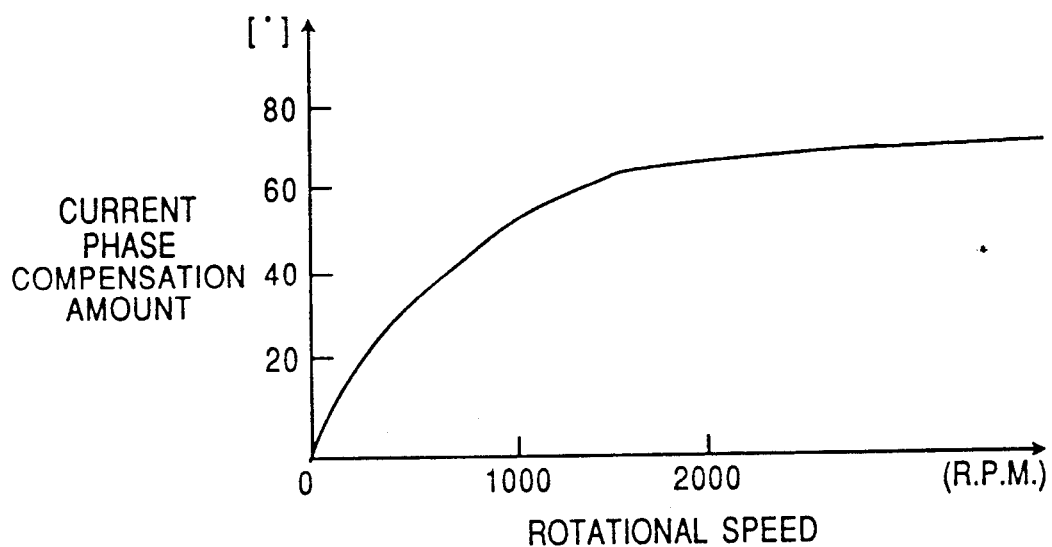
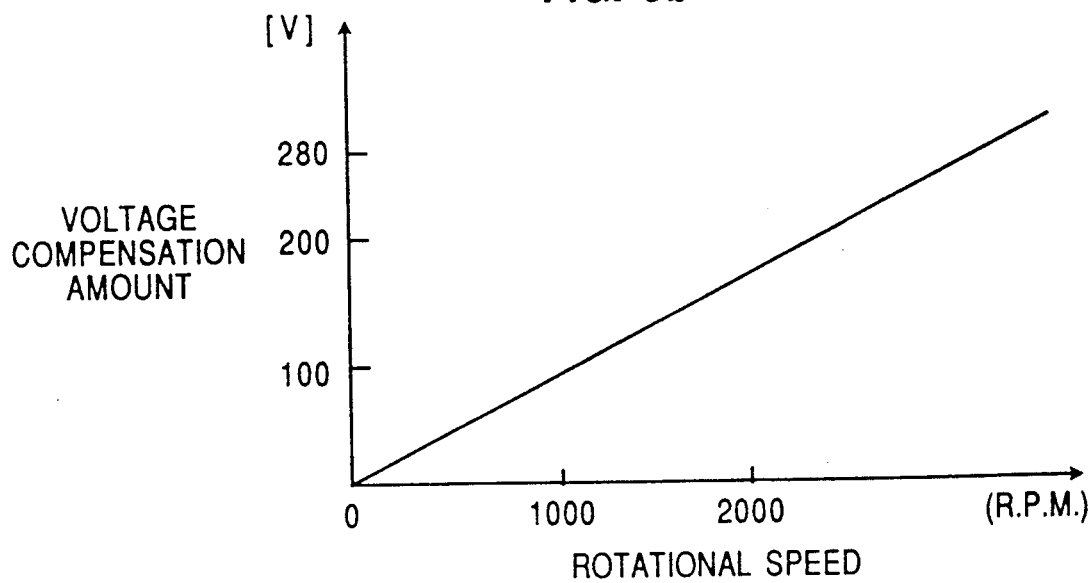

SERVO MOTOR CONTROL APPARATUS

BACKGROUND OF THE INVENTION

1. Field of the Invention

The present invention relates to a servo motor control apparatus and, more particularly, to an apparatus effecting feedback control of a servo motor according to an external operation command.

2. Description of the Related Art

Servo motors are widely used in various kinds of numerical control (NC) machine tools, working robots, measuring apparatuses, or the like, and an apparatus controlling the servo motor effects a feedback control according to an external operation command. For example, when the servo motor control apparatus receives information of an aimed rotational position and an aimed rotational speed as the operation command, it computes a command value of drive current (hereinafter referred to as a current command value) to be fed to the servo motor based on the above aimed values, an actual rotational position and an actual rotational speed of the servo motor, and multiplies a deviation between the current command value and current actually flowing in the servo motor (hereinafter referred to as an actual current) by a predetermined coefficient (feedback gain) to carry out the feedback control. The servo motor produces rotational magnetic fields upon receipt of the drive current from the control apparatus and causes its rotor to be rotated in synchronization with the rotational magnetic fields.

As the rotational speed of the servo motor is increased, however, the actual current lags by a certain phase amount behind the current command value. Namely, with the increase in the rotational speed, the phase difference between a power supply voltage applied to the servo motor and the actual current is made larger and thus so-called reactive power components are increased. Note, the current command value is synchronous with the power supply voltage.

Although the current command value is controlled so that it takes an optimum phase based on the aimed values and the feedback values, the actual current (i) is represented, using the maximum value of the power supply voltage ($V_m$), the angular frequency ($\omega$), the resistance (r) and inductance (L) of the motor winding, by the following formula:

$$\begin{aligned} i &= V_m \cdot \sin\omega t / (r + j\omega L) \\ &= V_m / (r^2 + (\omega L)^2) \times \sin(\omega t - \theta), \end{aligned}$$

where $\theta = \tan^{-1}(\omega L / r)$.

Therefore, the actual current i lags by a phase difference $\theta$ compared with the current command value corresponding to the rotational position of the servo motor. Note, this phase difference fluctuates somewhat according to individual characteristics of each motor.

FIG. 1 illustrates the above relation, in which a solid line represents the current command value; a broken line represents the actual current (i); and a dashed line represents the phase difference (deviation) between the current command value and the actual current (i). Also, a hatched portion shows an reactive component which does not contribute to the rotation of the servo motor among the current fed to the servo motor. According to a conventional servo motor control apparatus, the feedback gain is selected so that the reactive component is minimized.

Referring to the above formula, however, since the phase difference (phase lag) $\theta$ is changed depending on the rotational speed ($\omega$), it is very difficult to always select an optimum feedback gain with respect to all of the rotational speeds and, accordingly, it is only possible to select an optimum value for a rotational speed which is utilized most frequently.

As a result, a drawback occurs in that, especially when the rotational speed is made higher, the reactive components are increased resulting in a lowering in efficiency of the servo motor. Namely, the percentage at which the current fed to the servo motor contributes to a torque is decreased and thus calorific power is relatively increased.

Also, when the servo motor rotates, counter electro motive force (E.M.F.), i.e., induced voltage, is generated in an armature winding coil of each phase of the servo motor. This counter E.M.F. (E m) is generated in the direction in which it counterbalances the current fed to the servo motor, and represented, using the number of turns (N) of the coil and the magnetic flux ($\Phi$) linking to the coil, by the following formula:

$$E_m = N \cdot d\Phi/dt.$$

where $\Phi = \Phi_m \cdot \sin\omega t$, in which $\Phi_m$ indicates the maximum value of the magnetic flux. Namely, the counter E.M.F. (E m) is proportional to the rate of change in the magnetic flux, i.e., the rotational speed of the servo motor.

As a result, a problem occurs in that, especially when the rotational speed is made higher, the voltage actually applied to the servo motor is lowered by the influence of the counter E.M.F.(E m) and, accordingly, the actual current becomes smaller than the current command value. Therefore, the torque of the servo motor is made small compared with the aimed value indicated by the operation command.

To cope with this, a conventional servo motor control apparatus detects the actual armature current and effects the current feedback control such that the aimed current flows in the servo motor.

However, since the current feedback control must be carried out at the highest speed in the servo system as described later, a burden on the servo motor control apparatus is made heavy. Also, sensing elements for detecting the armature current needs to be provided and, accordingly, the constitution of the control apparatus relatively becomes complicated.

On the other hand, an apparatus effecting a pulse width modulation (PWM) control is known which compares a torque command value with a feedback value, substitutes the difference between their values for a predetermined function to determine a PWM command value, and feeds three-phase alternating current having a magnitude corresponding to the determined PWM command value to the servo motor by means of the PWM control. For example, an example of the apparatus employing the PWM control is disclosed in Japanese Unexamined Patent Publication (Kokai) No. 63-148891, which is intended to improve a response of the control system including a servo motor by setting the function for determining the PWM command value in consideration of resistance and inductance of the armature coil of the servo motor.

However, even if the above constitution is intended to improve the response of the system by regulating the function for the PWM command value and the current feedback gain, a disadvantage arises in that the constitution cannot be adapted to changes in individual characteristics of various motors to be controlled and thus the improvement of the response is limited. This is because the characteristics of the servo motor are changed by the change in running states to cause the change in energy losses and, even if the current corresponding to the computed PWM command value is fed to the motor, the drive power required for the motor is not generated. Thus, where the drive power required for the motor is not generated, the output torque of the servo motor fluctuates microscopically even if it is constant macroscopically. As a result, for example, where the servo motor is used as a driving source of a tool of a machinery processing apparatus, a drawback occurs in that, when an extremely precise processing is carried out, nonuniformity is formed on the processing surface.

SUMMARY OF THE INVENTION

An object of the present invention is to provide a servo motor control apparatus which can compensate for a phase difference between a current command value and an actual current irrespective of a rotational speed, thereby efficiently controlling the servo motor.

Another object of the present invention is to provide a servo motor control apparatus which can generate a desired torque with relatively simple constitution.

Still another object of the present invention is to provide a servo motor control apparatus which can improve a response thereof to prevent an output torque from fluctuating.

The above objects are attained by providing a servo motor control apparatus effecting a feedback control of a servo motor according to an external operation command, the servo motor control apparatus including: an operational state detecting unit for detecting an operational state of the servo motor; a memory unit in which data representing inter-relation values are stored, the inter-relation value being defined in advance in accordance with operational states of the servo motor so that a drive power of the servo motor approximates a value indicated by the external operation command; a current value computing unit for specifying an inter-relation value corresponding to the detected operational state with reference to the data representing inter-relation value stored in the memory unit and computing an appropriate drive current value for the external operation command based on the specified inter-relation value; and a driving unit for driving the servo motor according to the computed appropriate drive current value.

BRIEF DESCRIPTION OF THE DRAWINGS

Other objects and features of the present invention will be described hereinafter in detail by way of preferred embodiments with reference to the accompanying drawings, in which:

FIGS. 3a and 3b are graphs showing the relation between the rotational speed and the current phase compensation amount and voltage compensation amount, applied to the first and second embodiments;

DESCRIPTION OF THE PREFERRED EMBODIMENTS (1) First embodiment (see FIGS. 2, 3a, 4 and 5a)

Figure 1:
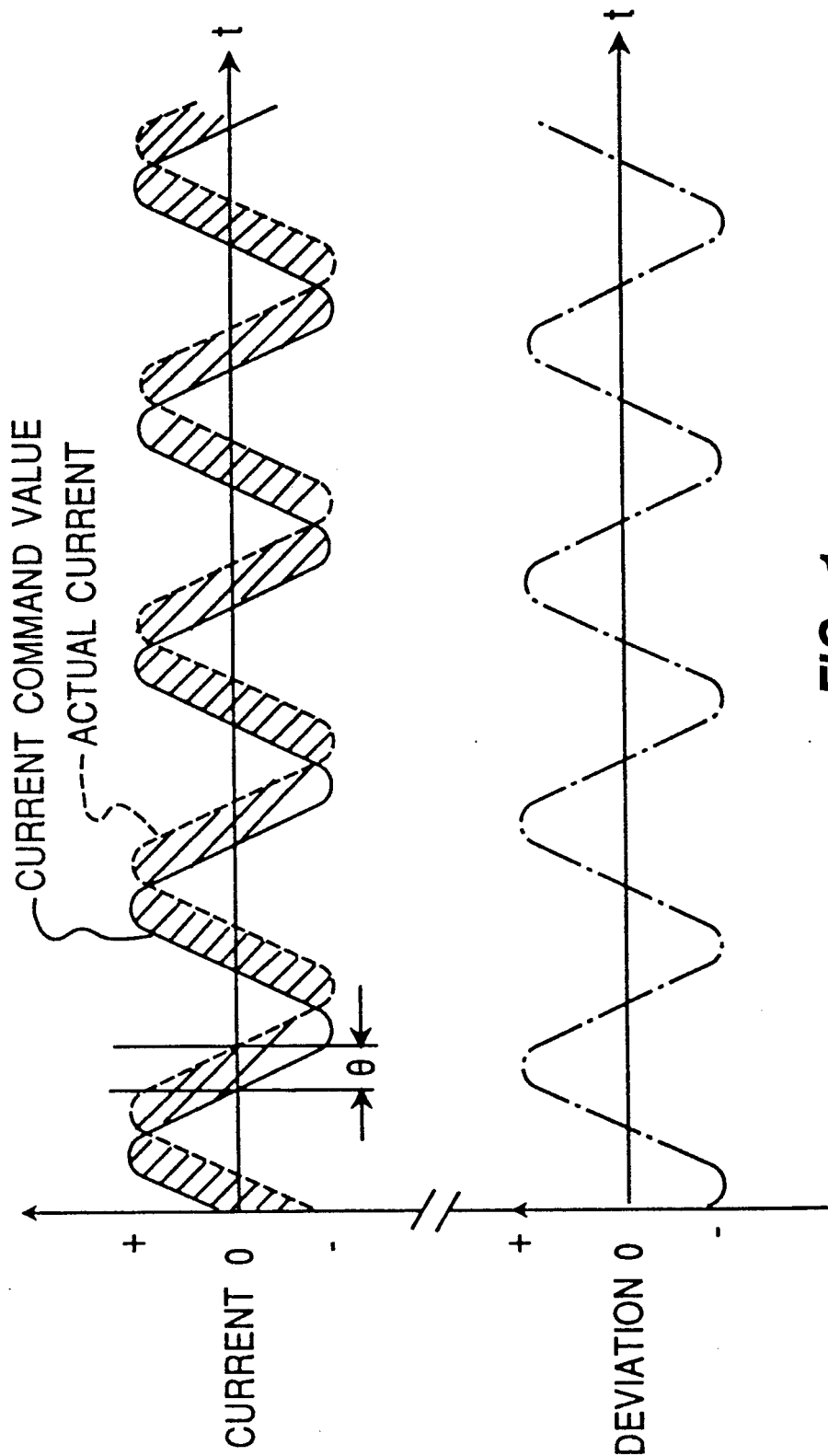
FIG. 1 is a waveform diagram for explaining problems in a prior art.
Figure 2:
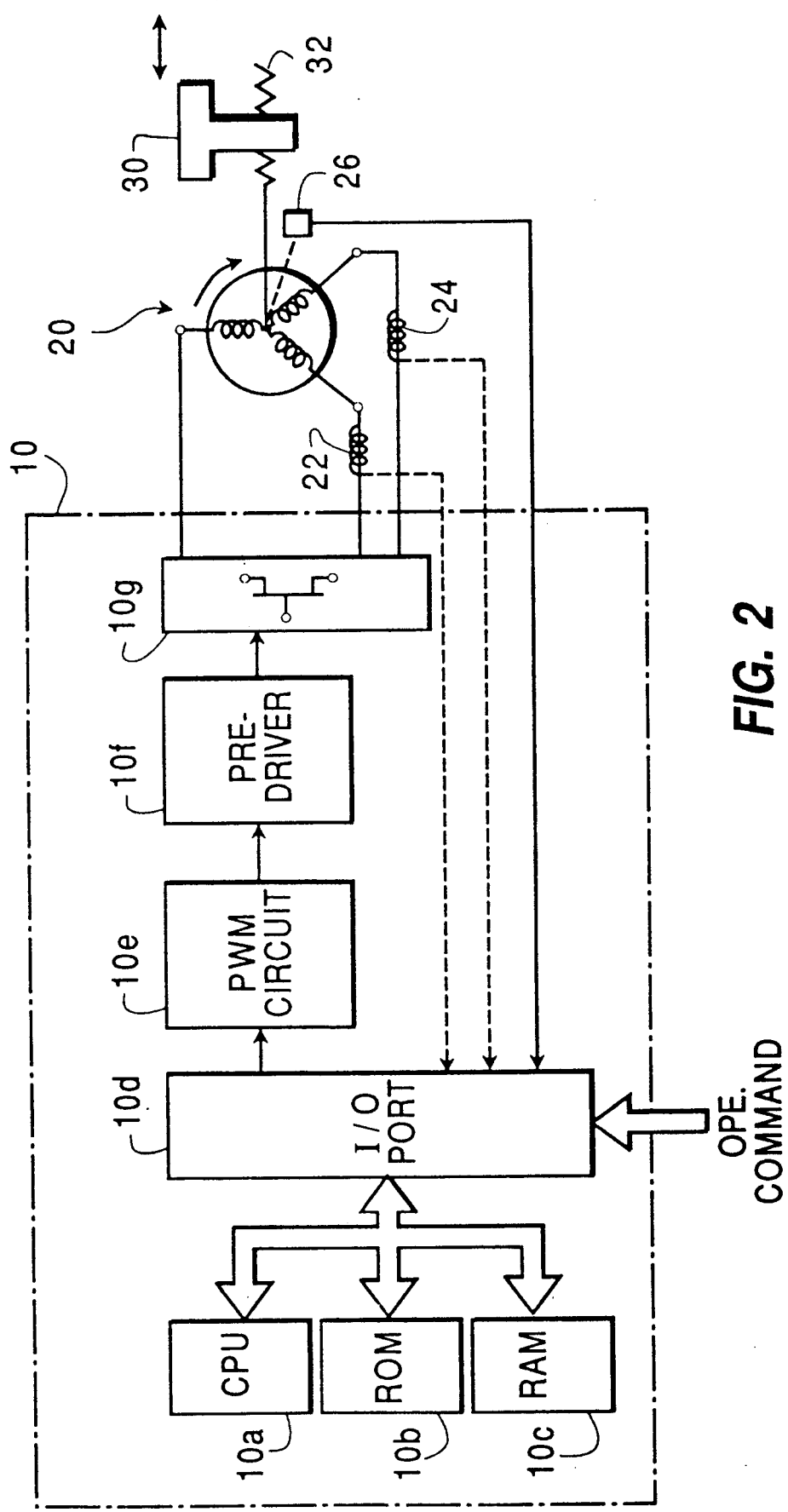
FIG. 2 is a block diagram illustrating a constitution of the servo motor control apparatus, common to each embodiment of the present invention.

FIG. 2 illustrates a constitution of the servo motor control apparatus, common to each embodiment of the present invention.

In FIG. 2, reference 10 denotes a controller, which is constituted by a digital circuit including a microcomputer as a main constituent element, in consideration of simplification and general purpose thereof. Namely, the microcomputer includes: a CPU (central processing unit) 10a for executing logic operation; a ROM (read only memory) 10b for storing various control programs to be executed by the CPU 10a and various data tables employed in the programs with non-volatility; a RAM (random access memory) 10c for temporarily storing information and assisting the logic operation of the CPU 10a; and an input/output (I/O) port 10d for effecting input/output of data between the logic circuit and external hardware elements.

As other elements, the controller 10 is provided with a PWM circuit 10e outputting a PWM signal corresponding to a PWM command value fed from the I/O port 10d, a pre-driver 10f responsive to the PWM signal, and a power amplifier 10g constituted by power transistors which is driven by the pre-driver 10f and generates PWM-controlled three-phase alternating current. The PWM-controlled three-phase alternating current is fed to a servo motor 20 as an armature current. Thus, the servo motor 20 is driven and controlled by the control signal (PWM command value) output from the I/O port 10d, i.e., by the above logic circuit including the CPU 10a.

The controller 10 effects a feedback control to stably control the servo motor 20 with high precision. In this case, two coils 22 and 24 for sensing the armature current for detecting a torque generated by the motor 20 are coupled to the armature windings, and an encoder 26 for detecting a rotational position of the motor 20 is coupled to a rotational axis thereof. Therefore, information fed back to the controller 10 consists of output signals of the sensing coils 22 and 24 (shown by broken lines) and an output signal of the encoder 26. Note, the rotational position of the motor 20 detected by the encoder 26 represents a relative position between a stator and a rotor constituting the motor, and utilized as a rotational speed by being differentiated.

The rotational axis of the motor 20 is coupled to a ball-screw 32 which is threaded and engaged with a table 30 placing a work piece or the like thereon. Accordingly, when the rotational axis of the motor 20 is rotated, the ball-screw 32 is rotated and thus the table 30 can be moved in the left-to-right direction, and vice versa. In this case, the rotational amount and rotational speed of the rotational axis correspond to the movement amount and movement speed of the table 30, respectively.

Also, the ROM 10b of the controller 10 stores data representing current phase compensation amount besides the above control programs and data tables. The current phase compensation amount is defined by a phase lag of the actual current as a function of the rotational speed and, in advance, determined by a theoretical phase lag $\theta$ (explained in "Description of the Related Art") and a phase lag determined by experiment.

FIG. 3a shows the relation between the rotational speed and the current phase compensation amount. A data table having the illustrated relation is stored in advance in the ROM 10b, and it is possible to easily determine the current phase compensation amount by reading necessary information from the data table.

As is publicly known, since the logic circuit including the CPU is equivalent to an assembly of various electronic parts, it is possible to constitute desired various electronic circuits by making the logic circuit execute a predetermined program. In the present embodiment, the controller 10 effects the feedback control of the servo motor 20 according to the program stored in the ROM 10b.

Figure 4:
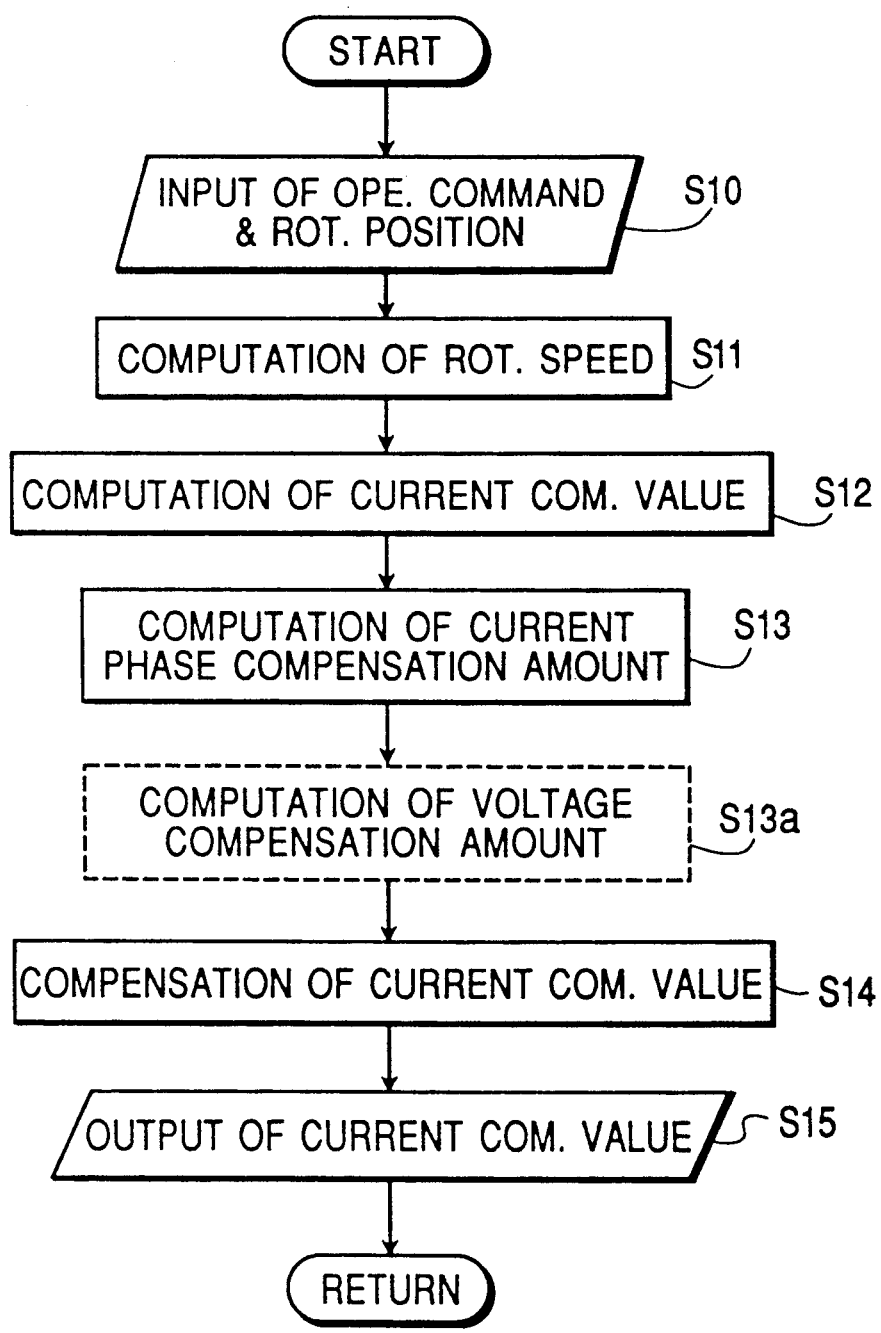
FIG. 4 is a flow chart for explaining the operation of the servo motor control apparatus according to the first and second embodiments.

FIG. 4 shows a flow chart representing the operation of the controller 10 according to the present embodiment. When the operation of the servo system including the controller 10 is started, the controller 10 repeatedly executes the program at every predetermined time interval.

When the control is first started (step S10), an operation command is input by an operator from the external via a keyboard (not shown) and information of an actual rotational position is input by the feedback from the motor 20 via the encoder 26. The operation command includes aimed information such as rotational position and rotational speed of the motor 20.

Next, at step S11, the control differentiates or calculates the actual rotational position of the motor 20 to compute an actual rotational speed thereof.

Next, at step S12, the control computes a current command value based on the operation command and the actual rotational position and rotational speed of the motor 20. The computation of the current command value is the same as in the conventional servo system and, accordingly, the explanation thereof is omitted.

Next, at step S13, the control searches a current phase compensation amount corresponding to the computed rotational speed from the data table (see FIG. 3a) stored in the ROM 10b, and determines the current phase compensation amount.

Next, at step S14, the control compensates the current command value computed at step S12 by the current phase compensation amount computed at step S13. This compensation is carried out by overlapping the current command value and a sine wave signal, which has the same peak value and frequency as the current command value and has a leading phase by the computed current phase compensation amount compared with the current command value. Namely, a new current command value different from the original current command value only in the phase is produced by the compensation.

Finally, at step S15, the control outputs the compensated current command value via the I/O port 10d to the PWM circuit 10e. The above explained processing is executed repeatedly.

Figure 5A:
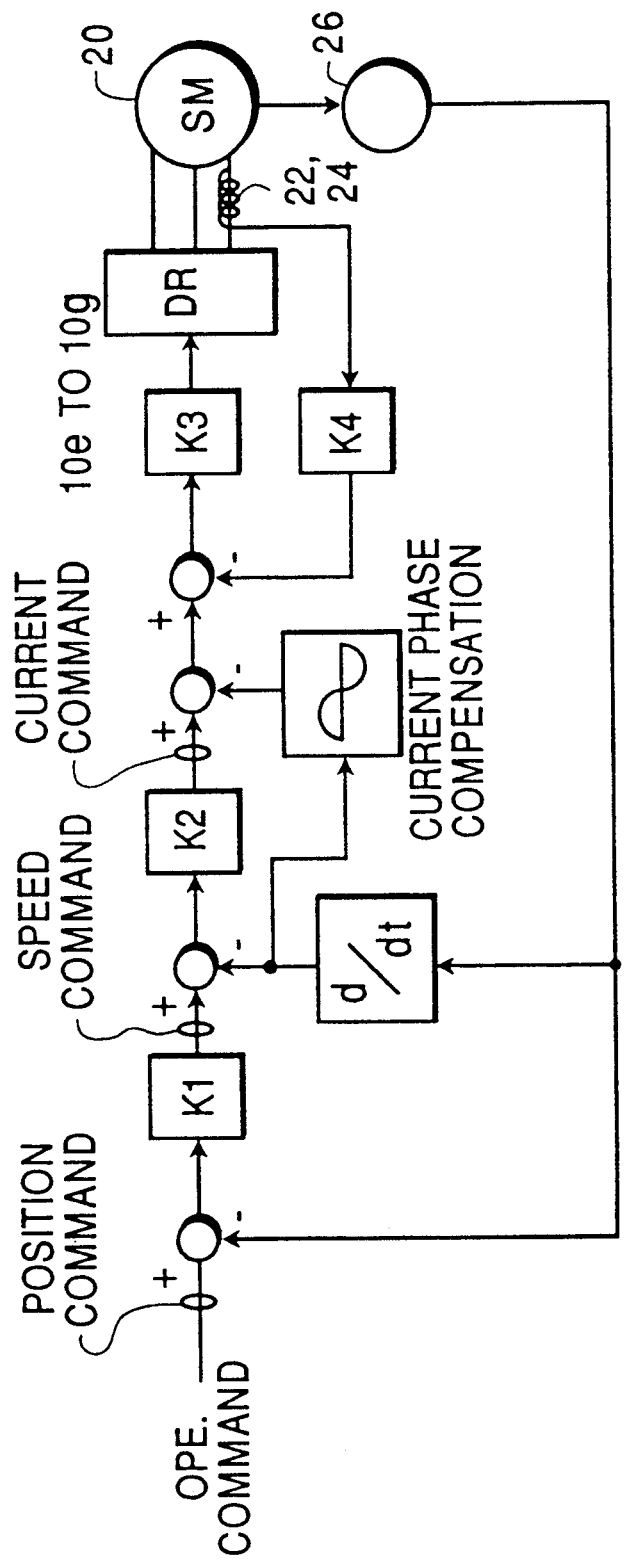
FIGS. 5a and 5b are block diagrams visually illustrating the equivalent circuits based on the flow chart of FIG. 4, with respect to the first and second embodiments.

FIG. 5a visually illustrates the equivalent circuit constituted as the controller 10 based on the flow chart of FIG. 4.

By executing the program of FIG. 4, the logic circuit including the CPU 10a constitutes a servo circuit having triple feedback loops as shown in FIG. 5a. Note, references K1 to K4 denote the aforementioned predetermined coefficient (feedback gain), respectively.

Explaining simply, when an external operation command is given to the servo system, the servo motor 20 is controlled by the feedback loops of three stages, i.e., position command, speed command, and current command.

The position command is added to a feedback value (rotational position) of the output of the encoder 26 and then multiplied by the gain K1 to form the speed command. The speed command is added to a differentiated feedback value (rotational speed) of the output of the encoder 26 and then multiplied by the gain K2 to form the current command. Also, the current command is compensated by the sine wave signal having a leading phase by the current phase compensation amount determined from the above rotational speed and, at the same time, is added to a feedback value which is the output of the coils 22, 24 multiplied by the gain K4 and then multiplied by the gain K3 to form the control signal of the driver (DR) 10e to 10g.

Also, the above triple feedback system is constituted such that the inner loop is controlled by the CPU 10a at higher speed. Namely, the current feedback is repeatedly controlled at the highest speed, in which the actual current is detected by the sensing coils 22, 24 and the control signal is fed to the driver 10e to 10g by the feedback control of the current command. The speed feedback is controlled at lower speed than the current feedback such that the rotational speed of the motor 20 controlled by the current feedback coincides with the speed command obtained from the position command. Also, the position feedback is controlled at the lowest speed such that the rotational position of the motor 20 controlled by the speed feedback coincides with the position command obtained from the operation command.

As explained above, according to the servo motor control apparatus of the present embodiment, it is possible to advance the phase of the current command value by an amount corresponding to the phase lag of the armature current due to the rotational speed in accordance with the rotational speed of the servo motor 20. Therefore, even if the rotational speed is increased, it is possible to cancel the phase lag of the actual current as a function of the rotational position of the servo motor. As a result, reactive current is prevented from flowing and the efficiency becomes higher. Also, since calorific power due to the reactive current of the servo motor is made zero, the lifetime of the motor can be prolonged.

Also, since the control apparatus according to the present embodiment employs not only the theoretically computed phase lag $\theta$ but also data determined by experiment when it computes the current phase compensation amount, it is possible to carry out the compensation for the phase lag with higher precision.

Furthermore, since the phase lag information as a function of the rotational speeds stored in advance in the ROM 10b, it is possible to reduce the time required for computing a phase lag for a certain rotational speed. This contributes to a high speed response of the servo system.

(2) Second embodiment (see FIGS. 2, 3a, 3b, 4 and 5b)

The present embodiment is the same as the first embodiment for the most part and, accordingly, only the differences between them will be described below.

Referring to FIG. 2, the sensing coils 22 and 24 are not provided. Namely, the current feedback control is not carried out. Therefore, information fed back to the controller 10 is only the output signal (rotational position) of the encoder 26.

Also, the ROM 10b of the controller 10 stores data representing voltage compensation amount besides the above current phase compensation amount. The voltage compensation amount is defined by a decreased amount of the actual current due to the counter E.M.F. as a function of the rotational speed and, in advance, determined by a theoretical counter E.M.F. E m (explained in "Description of the Related Art") and a decreased amount of the voltage determined by experiment.

FIG. 3b shows the relation between the rotational speed and the voltage compensation amount. A data table having the illustrated relation is stored in advance in the ROM 10b together with the data table having the relation illustrated in FIG. 3a. Accordingly, it is possible to easily determine the voltage compensation amount as well as the current phase compensation amount by reading necessary information from the data tables.

Referring to FIG. 4, the controller 10 according to the second embodiment further executes step S13a (shown by broken lines). Note, steps S10 to S13 and S15 are the same as the first embodiment.

At step S13a, the control searches a voltage compensation amount corresponding to the computed rotational speed from the data table (see FIG. 3b) stored in the ROM 10b, and determines the voltage compensation amount.

At next step S14, the control compensates the current command value computed at step S12 by the current phase compensation amount computed at step S13 and the voltage compensation amount computed at step S13a. In this case, the compensation by the voltage compensation amount is carried out by adding a value corresponding to the decrease of the current due to the counter E.M.F. to the current command value. Namely, a new current command value different from the original current command value in the phase and magnitude is produced by the compensation.

Figure 5B:
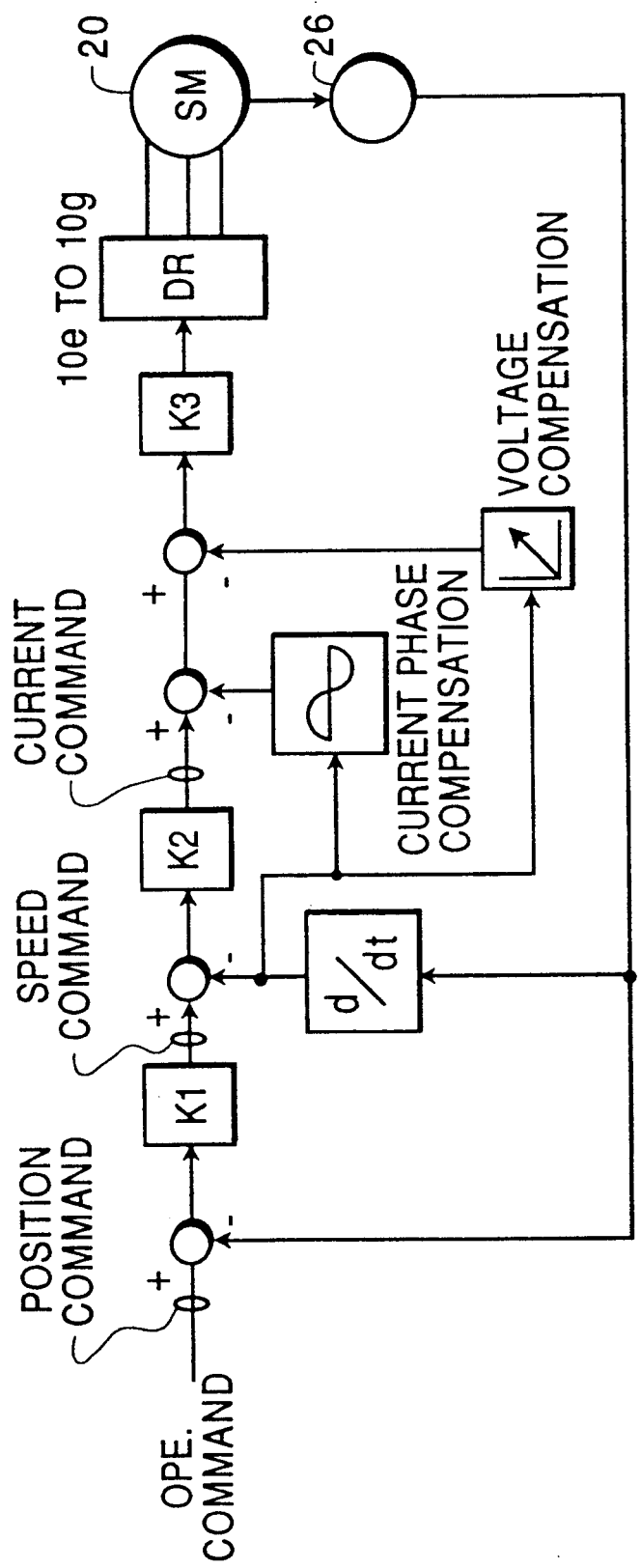

FIG. 5b visually illustrates the equivalent circuit constituted as the controller 10 based on the flow chart of FIG. 4, with respect to the second embodiment. By executing the above program, the logic circuit including the CPU 10a constitutes a servo circuit having double feedback loops as shown in FIG. 5b. Note, references K1 to K3 denote the aforementioned feedback gain, respectively.

In this case, when an external operation command is given to the servo system, the servo motor 20 is controlled by the feedback loops of two stages, i.e., position command and speed command.

The position feedback and the speed feedback are controlled in the same manner as the first embodiment.

Also, the current command is compensated by the sine wave signal having a leading phase by the current phase compensation amount determined from the above rotational speed and compensated by the voltage compensation amount determined from the rotational speed. The compensated current command is then multiplied by the gain K3 to form the control signal of the driver (DR) 10e to 10g.

Thus, according to the second embodiment, the following advantages are obtained in addition to the advantages of the first embodiment.

It is possible to increase the current command value by an amount corresponding to the decrease of the current due to the counter E.M.F. in accordance with the rotational speed of the servo motor. Therefore, even if the rotational speed is increased, it is possible to prevent the actual current from being decreased due to the counter E.M.F. As a result, a desired torque can be obtained.

Also, since the current feedback which is required to be carried out at the highest speed need not be carried out, a burden to the control apparatus is made light and the sensing elements 22,24 (of the first embodiment) becomes unnecessary. As a result, it is possible to constitute a servo system with simpler constitution and cheaper cost.

Furthermore, since the control apparatus according to the second embodiment employs not only the theoretically computed phase lag $\theta$ and counter E.M.F. Em but also data determined by experiment when it computes the current phase compensation amount and voltage compensation amount, it is possible to carry out the compensation for the phase lag and the compensation for the decrease of the current due to the counter E.M.F. with higher precision.

(3) Third embodiment (see FIGS. 2 and 6 to 8)

The constitution of the servo motor control apparatus according to the present embodiment is the same as the first embodiment (see FIG. 2). Note, in this case, a positioning control program and a data table defining the inter-relation between the current command value and the PWM command value are stored in advance in the ROM 10b of the controller 10.

Figure 6:
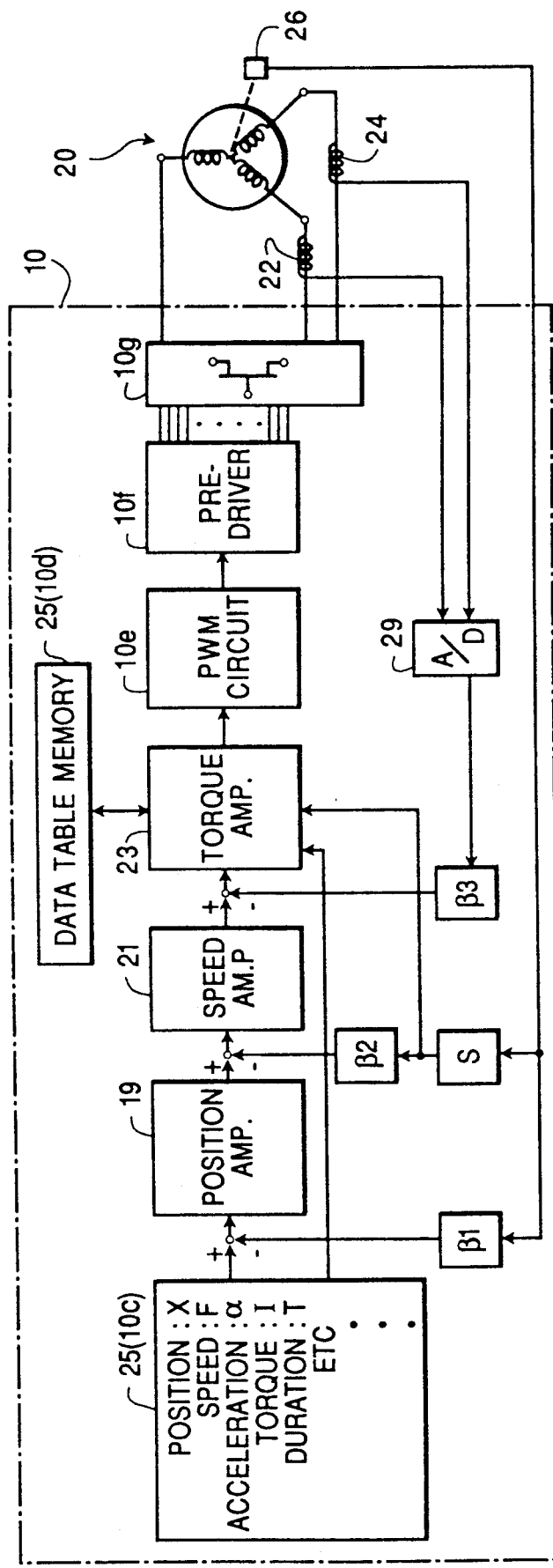
FIG. 6 is a block diagram illustrating a constitution of the servo motor control apparatus according to the third embodiment, in the form of the equivalent circuit.

By executing the positioning control program, the logic circuit including the CPU 10a constitutes a control system as shown in FIG. 6. The illustrated system consists of a position control feedback loop for effecting the processing of position amplifying 19, a speed control feedback loop for effecting the processing of speed amplifying 21 as the minor loop of the position control feedback loop, and a torque control (current control) feedback loop for effecting the processing of torque amplifying 23 as the minor loop of the speed control feedback loop. When the operation command data is input from a command part 25 (corresponding to the RAM 10c of FIG. 2), the logic circuit including the CPU 10a controls the torque with reference to data stored in a data table memory 27 (corresponding to the ROM 10b) and positions a control object such as a tool to the aimed position indicated by the command data.

On the other hand, the data table corresponds to the data stored in the data table memory 27 and, in the present embodiment, consists of a data table of value defining the inter-relation between the change in the value of energy loss occurring in the servo motor to be connected and the change in the operational state of the motor, and a data table of values defining the inter-relation between the compensation amount of the PWM command value necessary for compensating the energy loss and the energy loss value.

FIGS. 7a to 7e show the inter-relations defining each data table. Note, each data table is made in advance, with respect to a specific servo motor to be connected to the controller, by measuring the occurring energy loss with the operational state being changed, and by determining by experiment the compensation amount of the PWM command value necessary for compensating for the energy loss with the energy loss value being changed. In this case, the measurement and experiment are carried out under the condition that feedback control be not carried out.

Figure 7A:
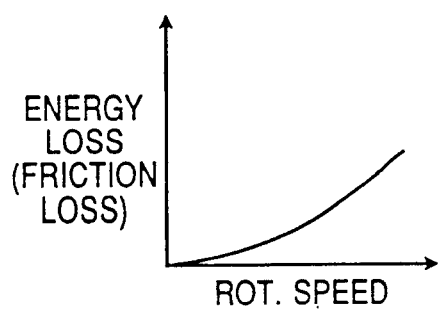
FIGS. 7a to 7e are graphs showing the interrelations which defines each data table employed in the apparatus of FIG. 6.
Figure 7B:
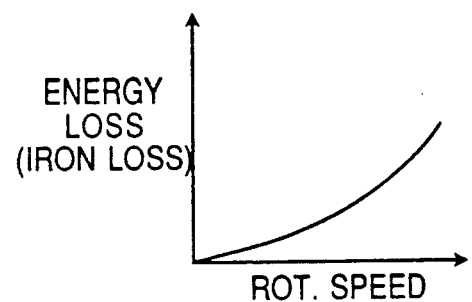
Figure 7C:
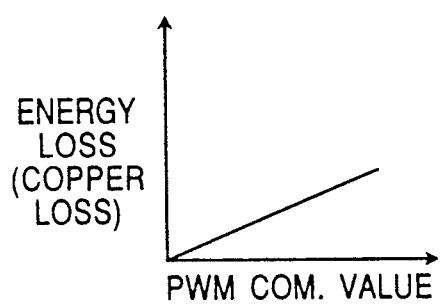
Figure 7D:
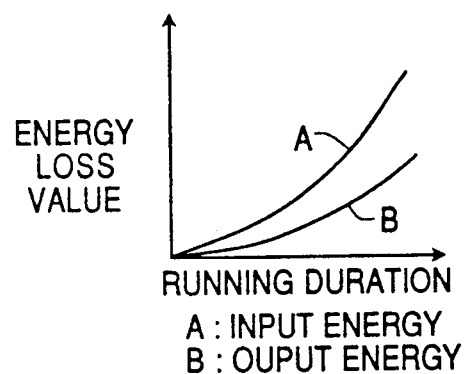
Figure 7E:
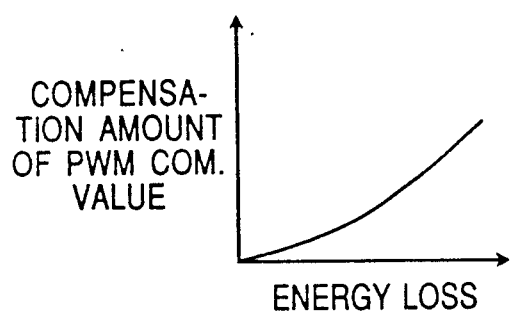

A first data table (see FIG. 7a) defines the relation between the energy loss value by a friction loss and the rotational speed as a variable, and a second data table (see FIG. 7b) defines the relation between the energy loss value by an iron loss and the rotational speed as a variable. The friction loss arises between the rotational axis and the bearings of housing and the like, while the iron loss arises due to the magnetic flux leaking from the core on which the armature coils are wound. As shown in FIGS. 7a and 7b, both the friction loss and the iron loss are increased with the increase in the rotational speed.

A third data table (see FIG. 7c) defines the relation between the energy loss value by a copper loss and the PWM command value as a variable. The copper loss mainly arises due to the calorific power and is increased with the increases in the PWM command value.

A fourth data table (see FIG. 7d) defines the relation of the energy loss value defined by the difference between the accumulated input energy value and the accumulated output energy value as a function of the running duration as a variable. The running duration participates in the temperature rise in the servo motor or the like, and the energy loss arises due to the change in characteristics of the constituent members, e.g., the change in resistance of the armature coils, the change in amplification factor of the power amplifier, or the like. The energy loss value is increased with the increase in the running duration.

A fifth data table (see FIG. 7e) defines the relation between the compensation amount of the PWM command value and the energy loss corresponding to the sum of the above four kinds of energy loss values. This data table is determined by experiment such that the compensation amount of the PWM command value is increased with the increase in the summed energy loss. This compensation amount is added to the original PWM command value.

Each data table explained above is made individually with respect to a specific servo motor to be connected to the controller because, even if the servo motor is of the same kind, the characteristics thereof are delicately different due to the constituent members.

The servo motor control apparatus of the present embodiment constituted above controls the servo motor as described below.

In FIG. 6, the position command value is first input from the command part 25 to the position control feedback loop. In the position control feedback loop, the position command value is compared with a position detected value from the encoder 26 multiplied by gain $\beta$1 and the deviation value between them is input to the position amplifying unit 19. The processing of computing the speed command value necessary for making the position detected value follow the position command value is carried out at every several milli-seconds.

In the speed control feedback loop, the computed speed command value is compared with a speed detected value which is the position detected value from the encoder 26 differentiated by differentiation factor S and then multiplied by gain $\beta$2, and the deviation value between them is input to the speed amplifying unit 21. In this case, the process of computing the torque (current) command value necessary for making the speed detected value follow the speed command value is carried out every several hundreds of micro-seconds.

Also, in the torque control feedback loop, the computed torque command value is compared with a value which is formed by digitizing the detected signals of the sensing coils 22,24 by means of an A/D converter 29 and multiplying the digitized value by gain $\beta$3, and the deviation value between them is input to the torque amplifying unit 23. In this case, the processing of computing the PWM command value with reference to the data defining the above inter-relations is carried out at every several tens of micro-seconds.

Figure 8:
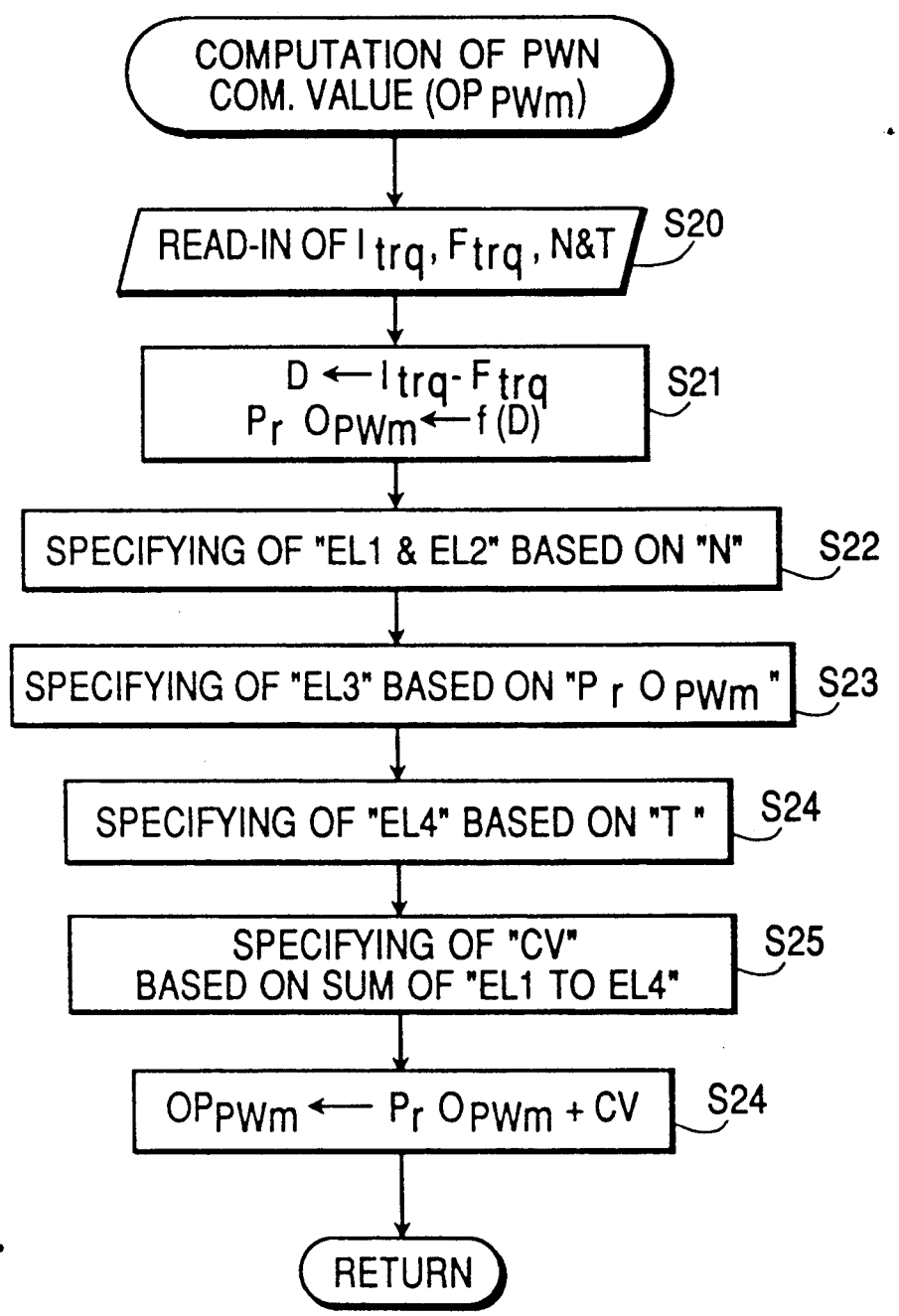
FIG. 8 is a flow chart for explaining the operation of the apparatus of FIG. 6.

FIG. 8 shows a flow chart representing an example of the processing routine for computing the PWM command value in the torque control feedback loop.

When the operation of the servo system including the controller 10 is started, the controller 10 repeatedly executes the program at every predetermined time interval.

First, at step S20, the control reads four data, i.e., a torque command value Itrq, a current feedback value Ftrq, a rotational speed detected value N and a running duration T. In this case, as the rotational speed detected value N, the feedback value in the speed control feedback loop is utilized. Also, the running duration T is obtained by a soft timer repeated at a predetermined time interval from the start of running of the servo motor 20.

Next, at step S21, the control subtracts the current feedback value Ftrq from the torque command value Itrq to compute the deviation value D and then substitutes the deviation value D for a predetermined function f(x) to compute a presumed PWM command value PrOpwm. Note, the function f(x) is publicly known from a proportional term, an integral term, or the like.

Next, at step S22, the control searches the above rotational speed detected value N from the data tables (see FIGS. 7a and 7b) stored in the data table memory 27(10b), and specifies the energy loss values EL1 and EL2 for the friction loss and iron loss corresponding to the rotational speed detected value N.

Next, at step S23, the control searches the above presumed PWM command value PrOpwm from the data table (see FIG. 7c), and specifies the energy loss value EL3 for the copper loss corresponding to the presumed PWM command value PrOpwm.

Next, at step S24, the control searches the above running duration T from the data table (see FIG. 7d), and specifies the energy loss value EL4 for the energy loss between the input/output energy corresponding to the running duration T.

Next, at step S25, the control sums up the specified four energy loss values EL1 to EL4, searches the summed energy loss value from the data table (see FIG. 7e), and specifies the compensation amount CV of the presumed PWM command value PrOpwm.

Finally, at step S26, the control adds the compensation amount CV to the presumed PWM command value PrOpwm to compute a PWM command value Opwm.

The computed PWM command value Opwm is fed from the I/O port 10d to the PWM circuit 10e, which generates the PWM signal in response to the PWM command value. The pre-driver 10f drives the power amplifier 10g based on the PWM signal and the power amplifier 10g feeds the PWM-controlled three-phase alternating current to the servo motor 20 as the armature current.

As explained above, according to the third embodiment, when the control apparatus computes the PWM command value Opwm based on the deviation value D between the torque command value Itrq output from the speed amplifying unit 21 and the current feedback value Ftrq thereof, it refers to the data tables (see FIGS. 7a to 7e) to obtain the PWM command value Opwm capable of compensating for the energy loss fluctuating depending on the operational state. Therefore, even if the characteristics of the servo motor 20 are changed with the change in the operational state, it is possible to control the three-phase alternating current to quickly follow up the torque command value Itrq and, accordingly, to improve the response of the control apparatus.

In the present embodiment, when the PWM command value is computed, the energy loss values aimed at the elements such as the friction loss, iron loss, copper loss or the like are employed. Since the elements are delicately different for individual servo motors and determine the main energy loss occurring in the motor, the PWM command value computed in the constitution of the present embodiment can surely compensate the energy loss fluctuating depending on the operational state. Accordingly, the output torque of the servo motor 20 is made constant macroscopically and microscopically. For example, where the servo motor 20 is used as a driving source of a tool of a machinery processing apparatus, it is possible to solve the problem in that, when an extremely precise processing is carried out, nonuniformity is formed on the processing surface.

Also, the control apparatus of the present embodiment is constituted such that the presumed PWM command value PrOpwm is computed from the deviation value D between the torque command value Itrq and the current feedback value Ftrq and the compensation amount CV corresponding to the operational state is added to the presumed PWM command value PrOpwm to form the PWM command value Opwm. Namely, since data to be stored as the inter-relation values is only the energy loss data which changes in accordance with the change in the operational state and the compensation data for compensating for the energy loss, it is possible to decrease the size of the data table memory 27 (10b).

Furthermore, since the change in characteristics due to the temperature rise in the servo motor is compensated by estimating the running duration T, an additional element such as a temperature sensor need not be provided. This contributes to simplification of the constitution of the apparatus.

Additionally, as the energy loss, another element such as wind loss may be introduced. Also, the servo motor may be provided with a temperature sensor and a data table defining the energy loss value corresponding to the sensed temperature may be prepared.

Although the present invention has been disclosed and described by way of three embodiments, it is apparent to those skilled in the art that other embodiments and modifications of the present invention are possible without departing from the spirit or essential features thereof.

We claim:

1. A servo motor control apparatus effecting a feedback control of a servo motor according to an external operation command, said servo motor control apparatus comprising:
   an operational state detecting means for detecting an operational state of said servo motor;
   a memory means for storing data representing inter-relation values, said inter-relation values being defined in advance in accordance with characteristics of a servomotor for coupling to the control apparatus so that a driving power of the servo motor approximates a value indicated by said external operation command;
   a current value computing means for specifying an inter-relation value corresponding to said detected operational state with reference to said data representing inter-relation values stored in said memory means and for computing an appropriate drive current value for said external operation command based on the specified inter-relation value; and
   a driving means for driving said servo motor according to said computed appropriate drive current value.

2. A servo motor control apparatus as set forth in claim 1, wherein said operational state detecting means includes means for detecting a rotational position of said servo motor and said current value computing means includes means for calculating the rotational speed in accordance with the detected rotational position.

3. A servo motor control apparatus as set forth in claim 2, wherein said operational state detecting means further includes means for sensing armature current of said servo motor.

4. A servo motor control apparatus as set forth in claim 3, wherein said current value computing means comprises:
   means for computing a drive current value based on said detected rotational position and rotational speed and said external operation command;
   means for determining a current phase compensation amount corresponding to said detected rotational speed based on a predetermined inter-relation value between current phase compensation amount and a rotational speed of said servo motor; and
   means for compensating a phase of said computed drive current value by said determined current phase compensation amount to provide said appropriate drive current value.

5. A servo motor control apparatus as set forth in claim 4, wherein said predetermined inter-relation value is stored in advance in said memory means, said current phase compensation amount being defined by a phase lag of actual sensed current as a function of said rotational speed based on theoretical values and experimental values.

6. A servo motor control apparatus as set forth in claim 2, wherein said current value computing means comprises:
   means for computing a drive current value based on said detected rotational position and rotational speed and said external operation command;
   means for determining a current phase compensation amount corresponding to said detected rotational speed based on a first predetermined inter-relation between current phase compensation amount and rotational speed of said servo motor;

means for determining a voltage compensation amount corresponding to said detected rotational speed based on a second predetermined inter-relation value between the voltage compensation amount and the rotational speed of said servo motor; and means for compensating a phase and a magnitude of said computed presumed drive current value by said determined current phase compensation amount and the voltage compensation amount to provide said appropriate drive current value.

7. A servo motor control apparatus as set forth in claims 6, wherein said first and second predetermined inter-relation values are stored in advance in said memory means, said current phase compensation amount and said voltage compensation amount being defined by a phase lag and a decreased amount, respectively, of actual current as a function of rotational speed based on theoretical values and experimental values.

8. A servo motor control apparatus as set forth in claim 2, wherein said memory means stores data representing an inter-relation value between a change in energy loss occurring in said servo motor and a change in operational states thereof and data representing an inter-relation value between the compensation amount of said external operation command necessary for compensating for said energy loss, and said energy loss.

9. A servo motor control apparatus as set forth in claim 8, wherein said external operation command is used as a factor representing an operational state of said servo motor when a torque command value is indicated by said external operation command.

10. A servo motor control apparatus as set forth in claim 9, wherein said current value computing means comprises:

means for computing a command value based on a difference between said torque command value and a current feedback value;

means for specifying each energy loss value corresponding to said detected rotational speed, said command value and a running duration of said servo motor based on the inter-relation values stored in said memory means;

means for specifying the compensation amount of said command value corresponding to a sum of said specified energy loss values based on the inter-relation value stored in said memory means; and means for compensating for the magnitude of said command value by said specified compensation amount to form a command value corresponding to said appropriate drive current value.

11. A servo motor control apparatus as set forth in claim 8, wherein said inter-relation values are determined by experimental values.

* * * * *